United States Patent [19]
Boudreau et al.

[11] Patent Number: 5,835,092
[45] Date of Patent: Nov. 10, 1998

[54] MECHANISM FOR NON-LINEAR BROWSING OF DIVERSE INFORMATION SOURCES

[75] Inventors: Dana L. Boudreau, Palo Alto; Ellen C. Campbell, Menlo Park; Kirsten L. Jones, San Jose; Michael L. Shields, Union City, all of Calif.

[73] Assignee: Silicon Graphics, Inc., Mountain View, Calif.

[21] Appl. No.: 629,967

[22] Filed: Apr. 9, 1996

[51] Int. Cl.⁶ ........................................ G06F 3/00
[52] U.S. Cl. .............................................. 345/347
[58] Field of Search ..................... 395/336, 337, 395/338, 340–347; 345/333, 334, 339, 336, 340, 342, 345, 347

[56] References Cited

U.S. PATENT DOCUMENTS

| | | | |
|---|---|---|---|
| 4,789,962 | 12/1988 | Berry et al. | 345/338 |
| 5,155,806 | 10/1992 | Hoeber et al. | 345/338 |
| 5,428,733 | 6/1995 | Carr | 345/342 |
| 5,487,143 | 1/1996 | Southgate | 345/342 |
| 5,493,658 | 2/1996 | Chiang et al. | 345/340 |
| 5,546,521 | 8/1996 | Martinez | 345/338 |
| 5,559,942 | 9/1996 | Gough et al. | 345/349 |

OTHER PUBLICATIONS

"Mastering Windows 3.1", SYBEX Publ. Co, pp. 107–109, 1993.

Primary Examiner—A. Katbab
Attorney, Agent, or Firm—Graham & James LLP

[57] ABSTRACT

Software implementing a display technique called "miniviews." Miniviews provide a single viewing mechanism for information from a variety of sources and keep supplemental and related information within easy reach by a user without interrupting the flow of a main information concept. Miniviews are displayed when predetermined portions of the surrounding browser is expanded and can be displayed in any order as predetermined by the author, depending on the portions of the surrounding browser expanded by the user. Miniviews reference the original copy of the information displayed therein, such that if the information at the single location is changed, information displayed in the miniview is also changed. A miniview of information attempts to duplicate the appearance of the native browser for that information. At the same time, where a native browser allows the user to range freely through a certain type of information, miniviews only allow a predetermined amount of information from given source to be displayed. A miniview also allows the user to jump to a native browser for information being viewed by a miniview.

31 Claims, 19 Drawing Sheets

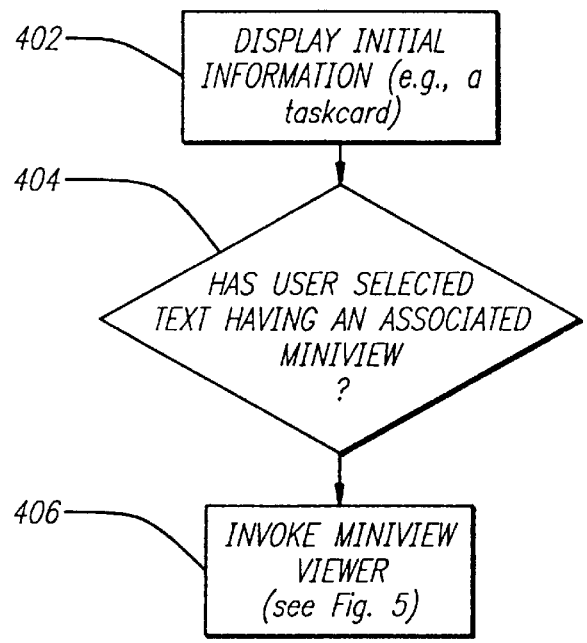
FIG. 4
To Start a Miniview
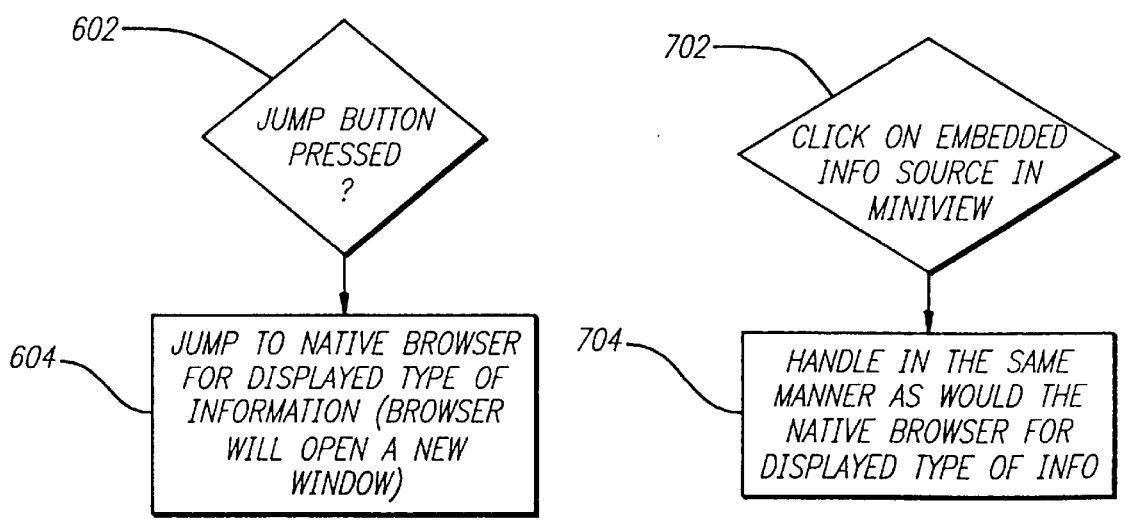
FIG. 6
FIG. 7

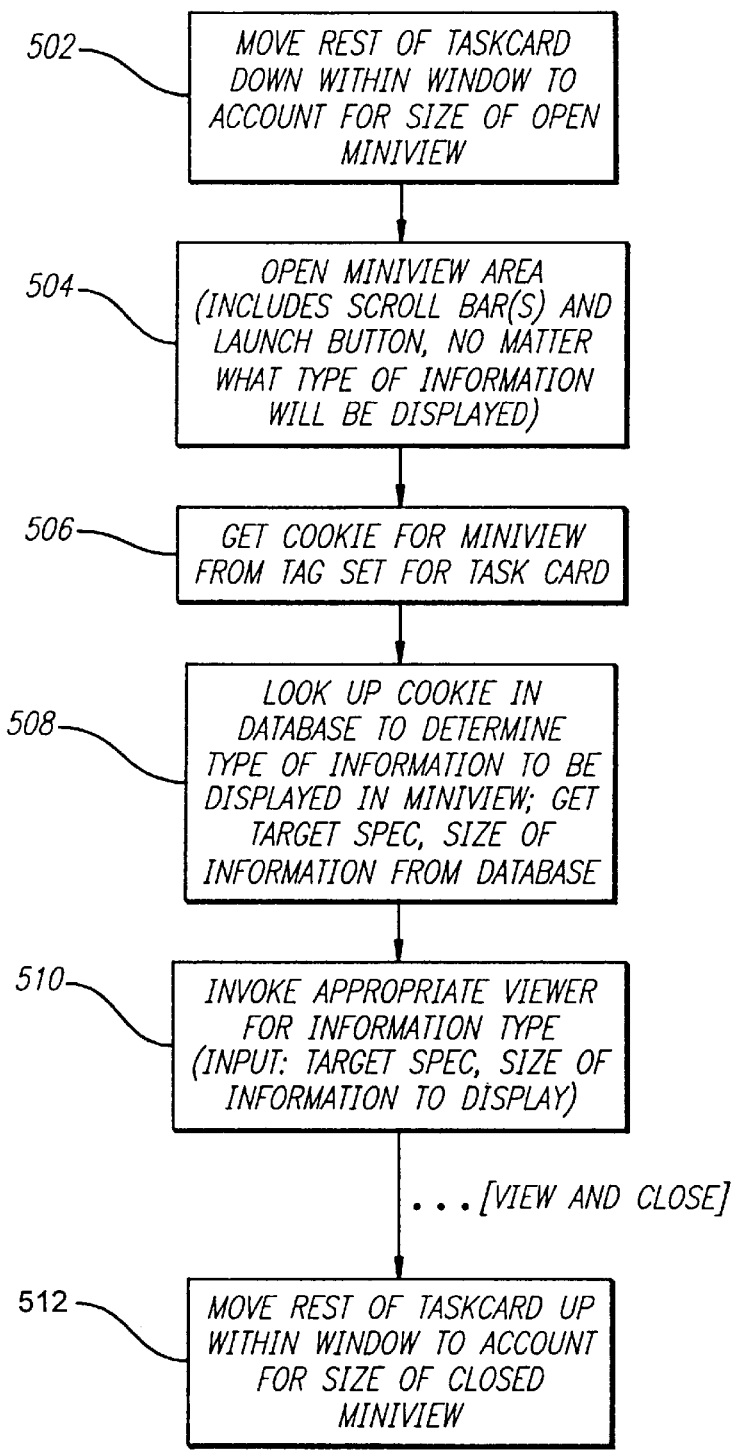
FIG. 5  Miniview Viewer

FIG. 8-a

```
<HTML>
<HEAD>
<TITLE>Testing the Network Connection</TITLE>
</HEAD>
<BODY>

Testing the network connection determines the current status of communication between
your workstation and the network. For example, do this task when a poor or faulty netw
ork connection may be causing your workstation to have unexplained delays or intermitt
ent operation.<P>
Definitions: <A HREF=:d23699cd-b21d-1001-8335-0800690716b8">communication</A> | <A HRE
F="d23699d0-b21d-1001-8335-0800690716b8">network connection</A> | <A HREF="d23699d9-b2
1d-1001-8335-0800690716b8">status</A> | <A HREF="d2a477df-b21d-1001-821f-08006908e822"
>workstation</A><P>

<HR>
<H2>How to do this task</H2>
Click the arrows to expand or collapse details for each topic.<P>
<DL>
<DT>Step 1. Test the ability to send and receive on the network.
<DD>Check the workstation network activity.
<DL>
<DT>Step 1.1. Select the "System Manager" from the System toolchest.
<DD><DL>
<DT>Image: "System Manager" selected from the System toolchest
<DD><IMG SRC="Image:SysTchst_SysMgr.gif" ALIGN=TOP>
<DT>Quick Launch: <A HREF="d2a4796e-b21d-1001-821f-08006909l363">System Manager</A>
</DL>
```

FIG. 8-b

```
<DD><IMG SRC="d2382063-b21d-1001-8a4e-0800690716b8" ALIGN=TOP>
<DT>Step 1.2. Select "Network" from the "Activity" menu in the "System Manager" window
.
<DD><DL>
<DT>Examples
<DD><DL>
<DT>Image: "Network" selected from the "Activity" menu
<DD><IMG SRC="Image:SysMgrWin_Activity_Network.gif" ALIGN=TOP>
<DT>Image: "Network Activity" window
<DD><IMG SRC="Image:NetworkActivityWindow.gif" ALIGN=TOP>
</DL>
</DL>
<DT>Advanced Tip: Using the "ping" command
<DD>If you are comfortable with UNIX commands, consider using the "ping" command</A> t
o see if your workstation can <A HREF="d2a476c8-b21d-1001-821f-080069091363">access</A
> another workstation on the network.
<DD><IMG SRC="d2351307-b21d-1001-8c1c-0800690716b8" ALIGN=TOP>
<DL>
<DT>Reference page: "ping" command
<DD><IMG SRC="d2351321-b21d-1001-8c1c-0800690716b8" ALIGN=TOP>
</DL>
</DL>
802——<DT>Step 2. Check the physical connection between the workstation and the network.
804——<DD><IMG SRC="d2351321-b21d-1001-8c1c-0800690716b8" ALIGN=TOP>
805——<DT>Troubleshooting
<DD><DL>
<DT>Message: "unix: <ethernet_device>: no carrier: check Ethernet cable"
```

FIG. 8-c

```
       <DD>This error message indicates that no network signal is being received, most likely
       resulting from a loose or disconnected cable.  Follow these directions to check the et
       hernet cable and other network hardware.
808——<DD><IMG SRC="d235l3lb-b21d-1001-8c1c-0800690716b8" ALIGN=TOP>
       </DL>
       </DL>
820——<DT>Step 3.  Check that the network software is turned on and running.
       <DD>Follow the steps in <A HREF="d23699e1-b21d-1001-8335-0800690716b8">Starting the Ne
       twork Software</A> to identify the current network settings, and restart the network i
       f necessary.
       <DL>
       <DT>Advanced Tip: Checking network status with the "chkconfig" command
       <DD>If you are comfortable with UNIX commands, you can use the "chkconfig" command</A>
       to determine if the network software is on or off.
       <DD><IMG SRC="d2382065-b21d-1001-8a4e-0800690716b8" ALIGN=TOP>
       <DL>
       <DT>Reference page: "chkconfig" command
       <DD><IMG SRC="d23699c8-b21d-1001-8335-0800690716b8" ALIGN=TOP>
       </DL>
       <DT>Step 3.1.  If the network does not respond, restart the workstation.
       <DD><IMG SRC="d2351323-b21d-1001-8c1c-0800690716b8" ALIGN=TOP>
       </DL>
       <DT>Step 4.  Check the system log for network error messages.
       <DD><DL>
       <DT>Step 4.1.  Select "View System Log" from the System toolchest.
       <DD><DL>
       <DT>Image: ""View System Log" on the System toolchest.
       <DD><IMG SRC="Image:SysTchst_VwSysLog.gif" ALIGN=TOP>
```

FIG. 8-d

```
</DL>
<DD><IMG SRC="d23699c9-b21d-1001-8335-0800690716b8" ALIGN=TOP>
<DL>
<DT>Troubleshooting
<DD><DL>
<DT>Problem: You are not a privileged user on the workstation.
<DD>If you are not a privileged user on the workstation, you must have a primary user or the system administrator perform certain activities for you, or obtain privileged user status.
<DL>
<DT>Tip: Identifying privileged users on a workstation
<DD><IMG SRC="d23699ca-b21d-1001-8335-0800690716b8" ALIGN=TOP>
<DT>Tip: Obtaining privileged user status
<DD><IMG SRC="d23699f8-b21d-1001-8335-0800690716b8" ALIGN=TOP>
</DL>
<DT>Message: "Administrative Privileges Required"
<DD><DL>
<DT>Image: "Administrative Privileges Required" message
<DD><IMG SRC="Image:Msg_AdmPrvlgRqd_NoRootPswd.gif" ALIGN=TOP>
</DL>
<DD>This warning message is a reminder that the workstation does not have an administrative password to protect data necessary for proper operation of the workstation. If you are uncomfortable with this responsibility, select "Cancel" on the notifier window and request a primary user or system administrator to perform the task for you.
</DL>
</DL>
<DT>Step 4.2. Review the system log for network warning messages.
<DD><DL>
```

FIG. 8-e

```
<DT>Image: Network warning messages in the "System Log Viewer" window
<DD><IMG SRC="Image:SysLogVwr_NtwkWrngMsgs.gif" ALIGN=TOP>
</DL>
<DD><IMG SRC="d23699cb-b21d-1001-8335-0800690716b8" ALIGN=TOP>
<DL>
<DT>Troubleshooting
<DD><DL>
<DT>Message: "Administrative Privileges Required"
<DD><DL>
<DT><Image: "Administrative Privileges Required" message
<DD><IMG SRC="Image:Msg_AdmPrvlgRqd_NoRootPswd.gif" ALIGN=TOP>
</DL>
<DD><IMG SRC="TC_Ref:messages.doc" ALIGN=TOP>
</DL>
</DL>
</DL>
<DT>Step 5. Check that the Desktop software is running properly.
<DD><IMG SRC="d2a47753-b21d-1001-821f-08006908e822" ALIGN=TOP>
<DT>Step 6. Check the network hardware.
<DD><IMG SRC="d235131e-b21d-1001-8c1c-0800690716b8" ALIGN=TOP>
</DL>

<HR>
<H2>Related information</H2>
<DL>
<DT>Follow these links for information on activities that precede, follow, or relate to this task.
```

FIG. 8-f

```
<DD><UL>
<LI><A HREF="d235131f-b21d-1001-8c1c-08006907l6b8">Troubleshooting Ethernet</A>
<LI><A HREF="d235131d-b21d-1001-8c1c-08006907l6b8">'ethernet' reference page</A>
<LI><A HREF="d2351320-b21d-1001-8c1c-08006907l6b8">Ethernet specifications</A>
</UL>
</DL>

</BODY>
</HTML>
```

FIG. 9-a

```
<TITLE>text</TITLE>
    Use text as Task Card title
<DL> ... </DL>
    Create a step list consisting of <DT>S and <DD>S
<DT>text
    Create a step using text as step title (always shown even when step is collapsed)
<DD>text
    Use text as the description for the current step (can contain <IMG> and <A> tags, and nested <DL>
    ...</DL> step lists); not shown when step is collapsed
<UL> ... </UL>
    Create a bulleted list consisting of <LI> tags
<LI>text
    Create text as an item in a bulleted list (must be inside <UL> ... </UL> pair)
902——<IMG SRC="targspec">
    Create miniview displaying information pointed to by targspec
<A HREF="targspec">description text</A>
    Display description text highlighted, and launch targspec if the user clicks on it
<P>
    Create a paragraph break
<BR>
    Create a line break
<EM>text</EM>
<B>text</B>
<CODE>text</CODE>
    Display text as emphasized, bold, and code, respectively
```

FIG. 9-b

```
<
>
&
&tm;
©right;
&restricted;
&squared;
    Display <, >, &, trademark, copyright, restricted, and superscript-2 symbols, respectively
```

FIG. 10-a

IRIX man pages:
ManPage:*Name*[/*SectionNumber*]
  ○ *Name* is the name of the command that the *man* page refers to.
  ○ *SectionNumber* is the number that appears after the name of the *man* page in its headers (e.g. in "open(2)", 2 is the section number). This is necessary because there are often several *man* pages with the same title. If the section number is omitted, and the title is ambiguous, the post-process link verification program will ask the author which one s/he meant.

Sections in Insight books:
Insight:*BookName*[/*SectionTitle*]
  ○ *BookName* is either the "short name" of the book (e.g. PerSysAdmin) or its full title (e.g. Personal System Administration Guide).
  ○ *SectionTitle* is the title of the target section in the book. If there is more than one section with this title, the post-process link verification program will give the author the opportunity to pick which one you actually want to link to. If no section title is specified, the whole book will be opened.

Glossary terms:
Gloss:[*BookName*/]*Term*
  ○ *BookName* is the name of the book that contains the term in its glossary. If this is not specified, or if the term cannot be found in that book's glossary, defaults to the Insight glossary.
  ○ *Term* is the term whose glossary entry you want.

Help cards:
SGIHelp: *Application*[/*CardTitle*]
  ○ *Application* is either the name of the application or the full path to the application's helpmap.
  ○ *CardTitle* is either the full title of the help card or the card's "help key" in the application's helpmap. If omitted, the launcher will bring up the help index for the application.

Task cards:
TaskCard: *Filename*
  ○ *Filename* is the filename of the taskcard, not including the past; for example,
    TaskCard:add.remote.shared.directory.
Program launch:
Cmd:*Command*
  ○ *Command* is the full command, including arguments.
Documents on a customer-accessible Oasis server:
Oasis:*Path*
  ○ *Path* is the filename of the document on Oasis.
Documents on Silicon Surf:
Surf:*PathFromTop*
  ○ *PathFromTop* is the path on Silicon Surf (i.e., everything after the "http://www.sgi.com/" in the URL).
Other Web documents or URLs:
URL:*URL*
  ○ *URL* is the URL to use.

FIG. 10-b

Miniview Database

MECHANISM FOR NON-LINEAR BROWSING OF DIVERSE INFORMATION SOURCES

FIELD OF THE INVENTION

This application relates to desktop software tools and particularly to a software tool that allows a user to display predetermined portions of online information within displays of other information.

BACKGROUND OF THE INVENTION

People who use computer systems and networks often need to look up information about the system they are using. Traditionally, information was stored in books and manuals, which were often kept physically near to the computer. If a user needed to look up information, he turned to a single source—paper manuals which were conveniently nearby.

Currently, however, the amount of technical information available about a given computer system can be very large and can be stored at a wide variety of sources. Information is often provided to customers in "online" form, dispensing entirely with paper copies. Large amounts of technical information are also available from third party sources and sources such as the World Wide Web.

Electronic information browsers ("browsers") are a mechanism for distributing and reviewing information using computers, supplementing and, in many cases, replacing traditional methods such as printed books. Browsers provide a method for viewing information such as text and graphics. In general, information is written to work with a specific browser and a browser often operates only within a specific computer configuration. Furthermore, each display of discrete information by a browser requires either duplication of the information or cross-referencing.

In general, information displayed must stay within specific rules of a browser. For example, some browsers display information as an electronic representation of a printed page. These browsers are easy to implement since they simply take information already in a page layout and display it on a monitor, rather than on the printed page. This method of display places a burden on the reader, however. If the reader resizes the viewing area of this type of browser, the result is similar to reading a printed page through a hole cut in the middle of a sheet of cardboard. Other browsers have evolved past the fixed presentation of a printed page by providing features such as wrapping text, which reformats text to fit within the viewing area if the reader changes the size of the viewing area. Regardless of the design, each conventional browser dictates a specific set of rules for writing information.

Because browsers are an evolution of traditional printing methods such as books, authors inherit some traditional limitations for presenting information. For example, If an author needs to present the same information in more than one location, there are several choices: 1) create a single instance of the information and define cross-references where applicable, or 2) duplicate the information in each location.

Cross-references are useful because they define a single instance of content, simplifying maintenance if changes need to be made to the information. The author changes a single location, rather than trying to locate and correct several instances. Cross-references, however, force readers to leave the context of their reading, locate the cross-reference, absorb it, and then pick up again from the point of departure. In addition, authoring tools are often rudimentary and it may be more difficult to create and maintain cross-references, which discourages their use by authors or which results in links that lead readers to the wrong or no destination.

Duplicating information for each instance is useful because the reading flow is uninterrupted. The cost of authoring maintenance, however, is prohibitive, since problems can propagate when incorrect information is duplicated. Furthermore, editing duplicate information involves locating and updating all duplicate references.

The consequence of these factors is that the author must write information to conform with the design rules of a specific browser, typically following the inherent linear nature of the traditional printed word. Additionally, the viewing of this information depends on a proprietary and temporary mix of computer hardware and software. Extra work and hardware such as data storage and memory are necessary to support the duplication or cross-referencing of information. Above all, readers find it frustrating to have to locate information spread across several different browsers.

SUMMARY OF THE INVENTION

The present invention overcomes the problems and disadvantages of the prior art by implementing a display technique called "miniviews." Miniviews provide a single viewing mechanism for information originating from a variety of sources and keep supplemental and related information within easy reach of a user without interrupting the flow of a main information concept. Moreover, miniviews allow all relevant information to be displayed within one visual location without causing a break in the user's train of thought.

Miniviews generally reside within a surrounding browser, such as the "taskcard browser" discussed herein. Miniviews, which can occur within the display of the surrounding browser in any order, quantity, and combination, allow the user to view different types of information within a view area opened within the surrounding browser. Miniviews reference the original copy of the information, such that if the information at the single location is changed, information displayed in the miniview is also changed.

A miniview that is displaying a specific type of information attempts to duplicate the appearance of the native browser for that information. At the same time, where each native browser allows the user to browse freely through a certain type of information, miniviews only allow a predetermined amount of information from given source to be displayed. In other words, using miniviews, the user can scroll through the original source only as far forward or backward as defined by the miniview.

A miniview does, however, allow the user to jump to a native browser for information being viewed by a miniview. By transferring to a native browser, the user can browse freely through any information in the information source that is stored with the information covered by the miniview.

Miniviews also retain any links embedded in the original information. Thus, for example, if the original information allows the user to click on highlighted terms to se a definition of those terms, a miniview of the information will also allow this function.

In accordance with the purpose of the invention, as embodied and broadly described herein, the invention is a method for displaying information from an information source to a user, comprising the steps, performed by a data processing system, of: displaying initial information by way of a surrounding browser; receiving input indicating that the user has selected a portion of the initial information for expansion; and expanding the indicated information as a miniview of the information source, where the miniview is inserted vertically within the initial information of the surrounding browser.

In further accordance with the purpose of this invention, as embodied and broadly described herein, the invention is a method for displaying a plurality of types of information to a user, comprising the steps, performed by a data processing system, of: displaying initial information by way of a surrounding browser; receiving input indicating that the user has selected a portion of the initial information for expansion; determining a predetermined type of information required to expand the indicated information; and expanding the indicated information as a miniview that displays the determined type of information, where the miniview is inserted vertically within the initial information.

Objects and advantages of the invention will be set forth in part in the description which follows and in part will be obvious from the description or may be learned by practice of the invention. The objects and advantages of the invention will be realized and attained by means of the elements and combinations particularly pointed out in the appended claims.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 4 is a flow chart showing steps performed to start a miniview from inside the surrounding browser.

FIG. 5 is a flow chart showing steps performed to display a miniview.

FIG. 6 is a flow chart showing steps performed when the user presses a "jump" button of a miniview.

FIG. 7 is a flow chart showing steps performed when the user selects embedded information in a miniview.

FIGS. 8(a) through 8(f) are an example of TaskCard Markup Language (TCML) code specifying the appearance and behavior of the surrounding browser of FIGS. 2 and 3.

FIG. 9 is an explanation of the syntax of FIG. 8.

FIG. 10 lists examples of how to specify the location of various types of information that can be viewed with miniviews.

DETAILED DESCRIPTION OF THE PREFERRED EMBODIMENTS

Reference will now be made in detail to the preferred embodiments of the invention, examples of which are illustrated in the accompanying drawings. Wherever possible, the same reference numbers will be used throughout the drawings to refer to the same or like parts.

Figure 1:
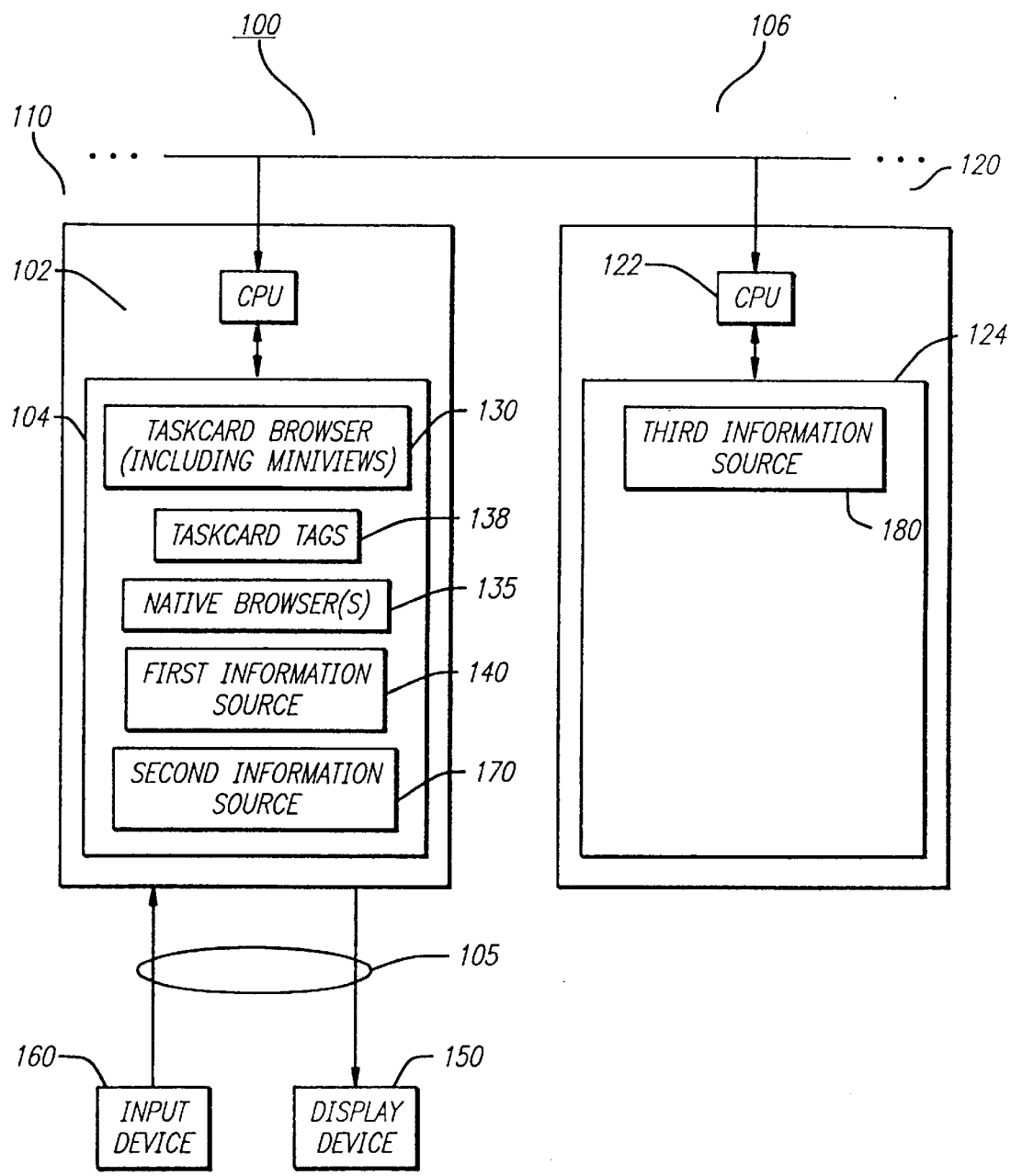
FIG. 1 is a block diagram of a computer system in accordance with a preferred embodiment of the present invention.

FIG. 1 is a block diagram of a computer system 100 in accordance with a preferred embodiment of the present invention. Computer 110 includes a first computer 110. Computer 110 includes a CPU 102, a memory 104, input/output lines 105, a display device 150 (e.g., a display terminal) and an input device 160 (e.g., a mouse). Computer system 100 can also include a second computer 120 connected to first computer 110 by way of a LAN, WAN, internet connection, etc. Second computer 120 includes a CPU 122 and a memory 124. It will be understood by persons of ordinary skill in the art that computer system 100 can also include numerous elements not shown in the Figure for the sake of clarity, such as disk drives, keyboards, display devices, network connections, additional memory, additional I/O elements, additional CPUs, LANs, etc.

Memory 104 includes software called a "taskcard browser" 130. Taskcard browser 130 is an example of a "surrounding browser" from which "miniviews" of the present invention are launched. The appearance and behavior of the surrounding browser text is defined in taskcard tags 138. Memory 104 also includes a plurality of information sources, including a first information source 140 and a second information source 170, along with "native browser" software for each type of information source. Memory 124 includes a third information source 180 and may also include additional native browsers (not shown). The operation of taskcard browser 130 is discussed in detail below. First, second, and third information sources 140, 170, and 180 can be of the same information type or different information types, as discussed in more detail below. Information source 180 may be, for example, a WebPage on the World Wide Web or an online database of "help information."

Computer 110 also includes an operating system (not shown), such as the Silicon Graphics' IRIX operating system, which is a version of the Unix operating system. "IRIX" is a registered trademark of Silicon Graphics, Inc. Computer system 100 also includes ViewKit, C++ library that adds convenient interfaces and functionality to the OSF/Motif X Toolkit, which is also a part of computer system 100. It will be understood that the present invention is not limited to any particular hardware, operating system, or type of computer system. The present invention, although implemented in an object-oriented methodology, is not limited to an object-oriented implementation.

Figure 2:
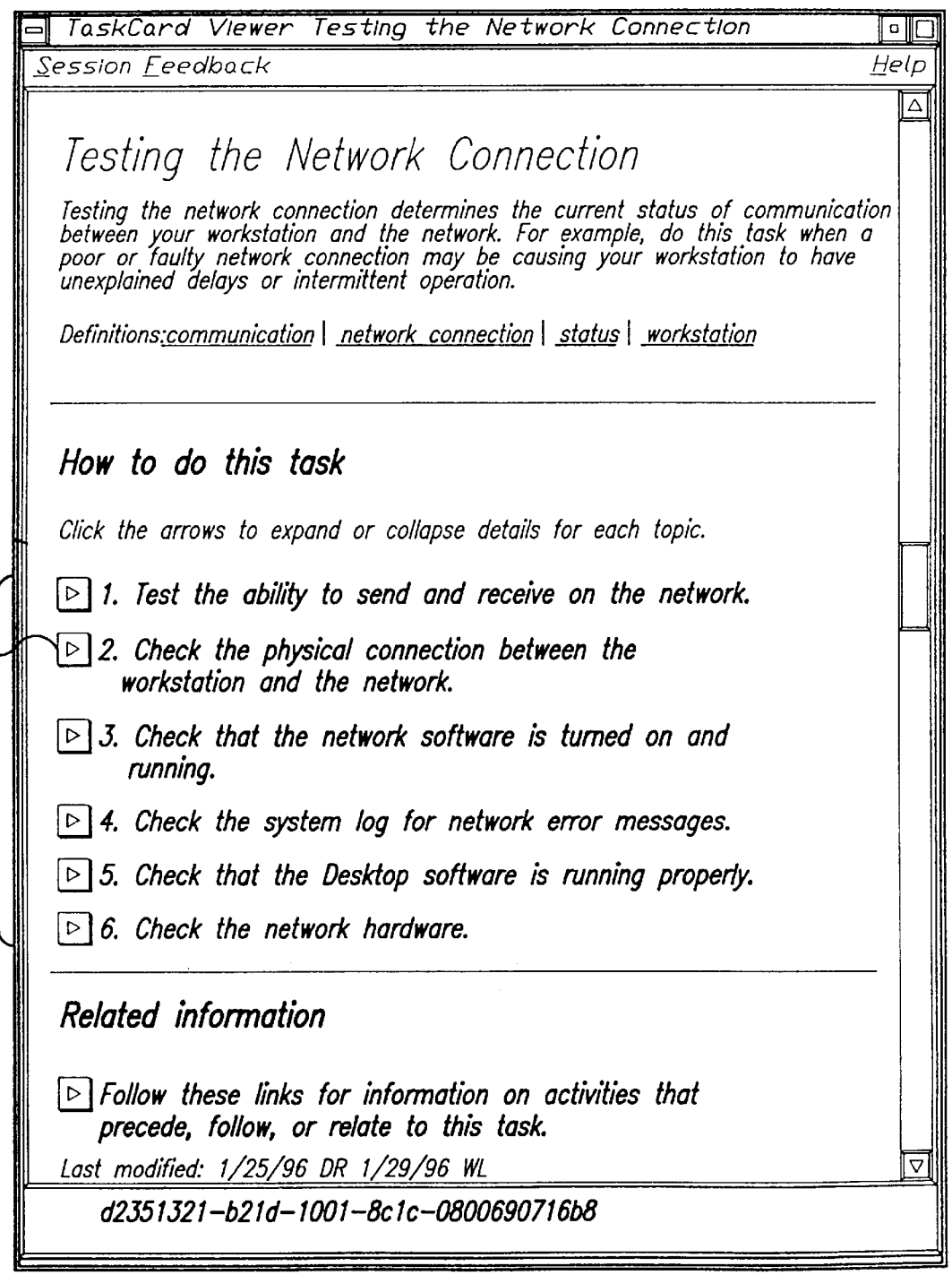
FIG. 2 shows an example of a surrounding browser of the embodiment of FIG. 1.

FIG. 2 shows an example of a surrounding browser of the embodiment of FIG. 1. Specifically, FIG. 2 shows an example of taskcard browser 130. It will be understood by persons of ordinary skill in the art that the present invention may be used with any suitable type or design of surrounding browser and that taskcard browser 130 is provided merely as an example of a browser used to launch miniviews. In FIG. 2, taskcard browser 130 is intended to help a user perform specific predetermined tasks chosen by the user. In FIG. 2, the user has chosen a taskcard 200 directed to testing a network connection. The taskcard browser 130 displays taskcard 200 on display device 150.

In the described embodiment, taskcard browser 130 parses taskcard tags 138 in order to display taskcard 200 of FIG. 2 inside a standard windowing system. The standard windowing system includes toolbars, scroll bars, and a pull-down menu, as known to persons of ordinary skill in the art. Taskcard 200 includes a plurality of displayed Steps 204, each of which has a forward pointing arrow 205 associated therewith. The arrow 205 indicates that the corresponding Step can be expanded. In the described embodiment, some of the Steps expand into miniviews, as discussed below.

Figure 3:
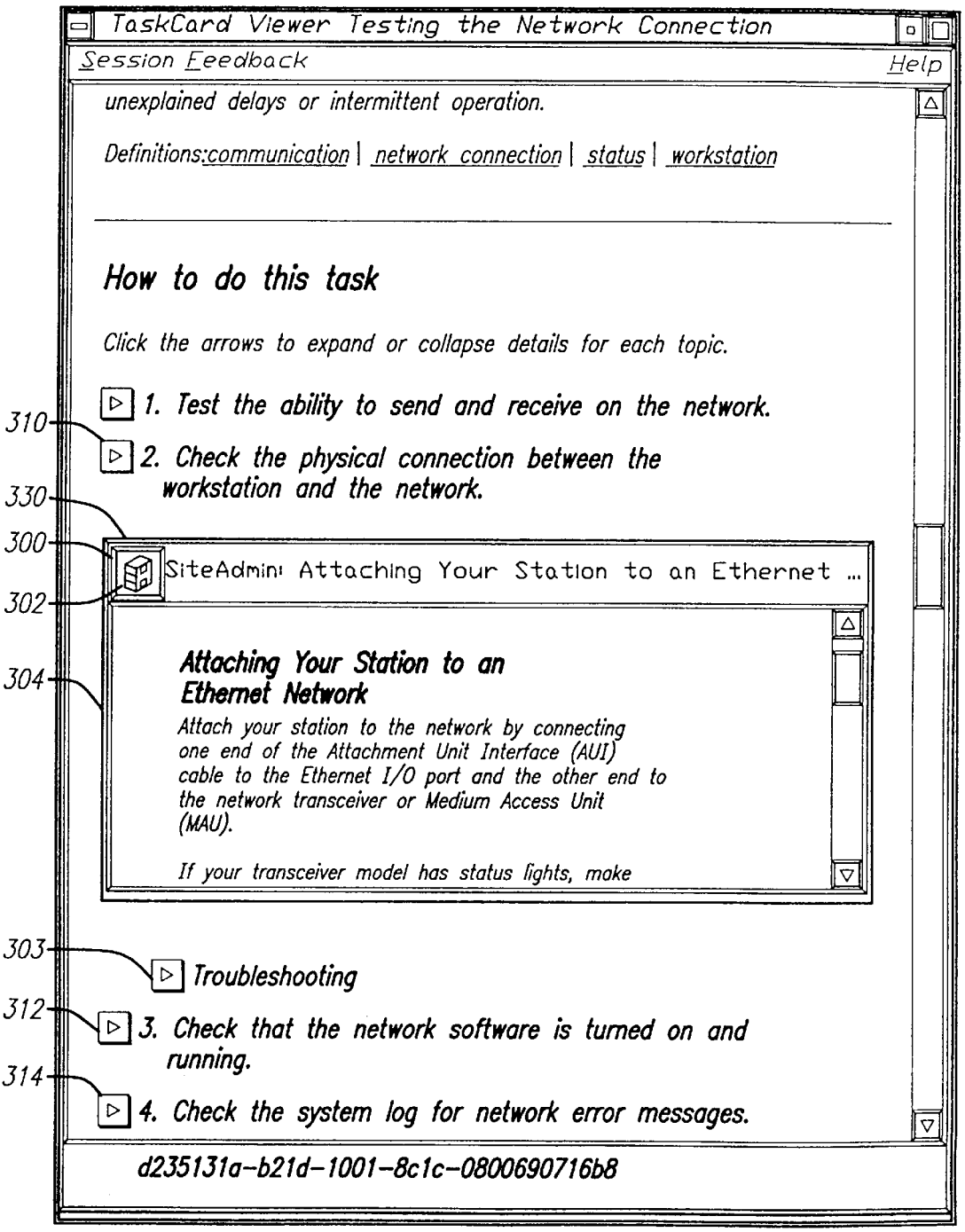
FIG. 3 shows the surrounding browser of FIG. 2 with a miniview opened.

FIG. 3 shows the surrounding browser of FIG. 2 where Step 2 has been expanded into a miniview 300 and a sub-step 303. Miniview 300 includes a title bar 302 and a viewing area 304. Note that the viewing area 304 has a scroll bar of a type known to persons of ordinary skill in the art, but that title bar 302 does not scroll along with viewing area 304. When Step 2 is expanded by the user clicking on the step, arrow 310 changes to a down pointing arrow to indicate that the step has been expanded.

FIG. 4 is a flow chart showing steps performed to start a miniview from inside taskcard 200. These steps, and all steps discussed in this document, are performed by CPU 102 (or by CPU 122) in accordance with instructions stored in memory 104, such as instructions of taskcard browser 130 or native browser 138. In step 402, an initial surrounding browser displays initial information, such as taskcard 200 of FIG. 2. As discussed above, the specific appearance and design of the surrounding browser is not necessarily a part of the present invention and any surrounding browser allowing the initialization of a miniview could be used. In step 404, if the user has selected a step having an associated miniview, control passes to step 406, which invokes software that displays the associated miniview, as described in FIG. 5.

In the described embodiment, a taskcard is defined by taskcard tags 138. An example of the taskcard tags for the display of FIGS. 2 and 3 is shown in FIGS. 8(a)–8(c). TaskCard tags 138 are also referred to as TCML ("TaskCard Markup Language). A syntax of taskcard tags is shown in FIG. 9. Taskcard browser 130 parses the taskcard tags of FIGS. 8(a)–8(c) and displays taskcard 200 in accordance with the taskcard tags. For example, Step 2 310 is displayed in accordance with line 802 of FIG. 8. Note that the taskcard browser does not show substeps defined in FIG. 8 until the corresponding step is expanded by the user. Thus, initially, as shown in FIG. 2, only Step 2 (line 802) and Step 3 (line 820) are displayed. As shown in line 804 and FIG. 9, a miniview is specified within taskcard tags 138 by the syntax "<IMG SRC="targetspec">" 902. Targetspec preferably is a unique identifier for the information, such as a "cookie," as discussed below. When the user clicks on Step 2 of FIG. 2, miniview 300 is displayed in accordance with line 804 and "Troubleshooting 303 " is displayed In accordance with line 805.

Note that the user does not know that a miniview will be displayed when he clicks on, e.g., step 2 of taskcard 200. Miniviews are displayed wherever a designer of the taskcard determines that it would help the user to view information from an original source. For example, the taskcard designer may have determined that the way for the user to learn more about Step 2 of taskcard 200 ("Check the physical connection between the workstation and the network") was to view a portion of the online manual discussing this function. Thus, S when the user clicks on Step 2, miniview 300 is displayed.

FIG. 5 is a flow chart showing steps performed to display a miniview. An important aspect of miniviews is that they are of a predetermined display size. Miniviews can display various types of information. For example, in the described embodiment, a miniview can display one of the types of information shown in FIG. 10. These information types include, but are not limited to:

1) IRIX manpages, which are online pages from the IRIX manual;

2) IRIS InSight books, which are online manuals specific to SGI computer systems ("IRIS InSight" is a trademark of Silicon Graphics, Inc.);

3) Glossary terms, as defined within the pages of IRIS InSight books;

4) TaskCards (i.e., a TaskCard can be displayed as a miniview in addition to being displayed by a surrounding browser);

5) Launch program (see "Jump" button, described below");

6) Documents on a customer-accessible Oasis Server;

7) Documents on Silicon Surf, which is an internal SGI Web site ("Silicon Surf" is a trademark of Silicon Graphics, Inc.); and 8) Documents on the World Wide Web.

IRIS InSight books are described, for example, in "IRIS InSight Professional Publisher Templates" and "IRIS InSight Professional Publisher User's Guide," both of which are available from Silicon Graphics.

Manpages are described, for example, in "Building Manual Pages and Release Notes." Information about Manpages can also be obtained from any UNIX system by typing "man man" (i.e., there is a manpage that defines manpages . . . ). Silicon Surf are described, for example, http://www.sgi.com and at "New Silicon Surf brings Silicon Graphics Data onto Information Superhighway," available at: http://www.sgi.com/Headlines/1994/Apr/apr_02.html.

Each of the above-described Web pages and manuals are herein incorporated by reference.

The present invention is not limited to display of the above types of information, however, and may display any type of information adaptable to be displayed as a miniview.

As shown in step 502 of FIG. 5, when a miniview is opened within a surrounding browser, a lower portion of the display of the surrounding browser is moved downward on the display to make room for the miniview. The miniview Is not draggable by the user and cannot be moved or sized within the surrounding browser. Thus, in FIG. 3, when Step 2 is expanded to show miniview 300 and substep 303, Steps 3 and 4 and all of the display below them are moved downward to make room for the miniview. After the lower portion of a display has been moved down, it is time to display a miniview. Step 504 opens a miniview area of predetermined size. A miniview area preferably includes one or more scroll bars, depending on whether the type of information to be displayed is larger than the predetermined size of the miniview window.

As discussed above, a miniview displays information from an original source, not from a copy. Each type of information that can be displayed requires a separate display routine adapted to display that type of information in a miniview. In general, each miniview displays a single type of information. Miniviews display each type of information as the information would be displayed by its "native browser," i.e, in a format in which the user is accustomed to seeing the information.

Figure 11:
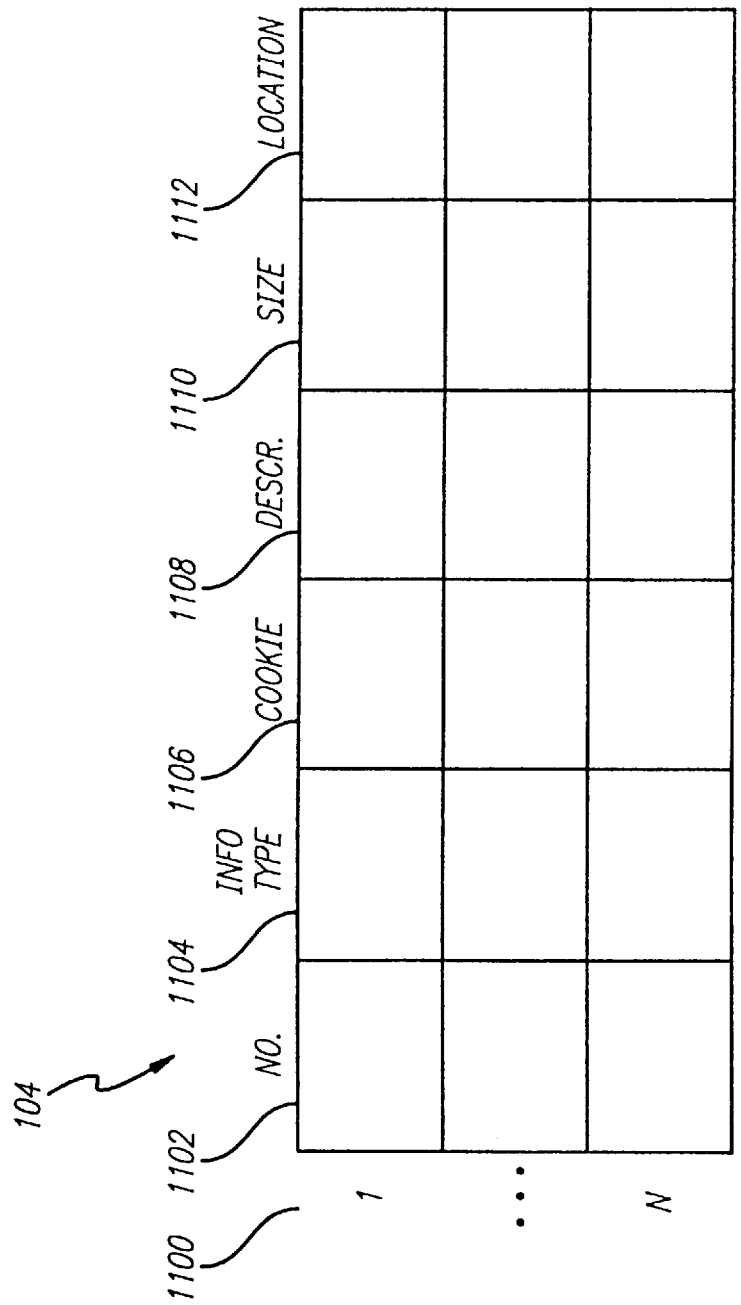
FIG. 11 shows a format of a database used in connection with the embodiment of FIG. 1.

FIG. 11 shows a format of a database 1100 used in connection with the embodiment of FIG. 1. Database 1100 is stored in memory 104. As discussed above, each piece of information capable of being displayed in a miniview is represented by a unique identifier. This identifier is called a "cookie." Thus, for example, in line 804 of FIG. 8, the cookie for the information in miniview 200 is "d235131a-b21d-1001-8c1c-0800690716b8." In the described embodiment, each cookie is random and guaranteed unique across hosts. As shown in FIG. 11, for each of N pieces of information that can be displayed in a miniview, database 1100 includes a number field 1102, an information type field 1104 identifying the information as being one of the types of FIG. 10, the cookie 1106 for the information, a textual description 1108 of the information, and a description 1110 of the size of the information that can be displayed. Since miniviews only allow predetermined portions of an information source to be displayed, size field 1110 may specify, for example, which predetermined portion of the original source information can be displayed as a miniview. The exact format of size field 1110 depends on the type of information described by the database entry. Location field 1112 specifies the location of the original information source to be displayed. The exact format of location field 1112 varies in accordance with the type of information described in the database entry, as shown in FIG. 10.

Returning to FIG. 5, step 506 is performed after a miniview area is opened. In step 506, taskcard browser 130 gets the cookie for the information to be displayed from taskcard set 138 (e.g., line 802 of FIG. 8). Step 508 finds the cookie in data base 1100 and determines the type, size and location of data is to be displayed in the miniview in accordance with respective fields 1104 1110, and 1112. Next, in step 510, a miniview viewer appropriate for the type of information to be displayed is called. Miniviews attempt to display each type of information is a manner with which the user is accustomed. Thus, each type of information requires an information-specific viewer.

After the miniview has been displayed and then closed by the user, step 512 removes the miniview area from the display and moves back into place the portion of the taskcard browser that was previously moved down. A miniview is closed by compressing the associated taskcard step or substep. Thus, if the user clicks on downward pointing arrow 310 of FIG. 3, that step will be compressed. When step 310 is compressed, miniview 300 is closed, substep 303 is removed, and all portions of the taskcard display below substep 303 are moved upwards to fill the space previously occupied by the miniview 300 and substep 303.

Although each miniview viewer provides a display in accordance with the type of information displayed, certain functions are common to most or all miniview viewers. FIG. 6 is a flow chart showing steps performed when the user presses a "jump" button 330 of a miniview. FIG. 7 is a flow chart showing steps performed when the user selects embedded information in a miniview. Jump button 330 is in the non-scrolling bar 302 of each miniview. Each jump button 330 preferably displays an icon representing a type of information displayed in the miniview. When a jump button 330 is pressed by the user, control transfers to a "native browser" for the particular type of information represented by the miniview. (A data structure correlating each type of information to a corresponding native browser is located in memory 104, but not shown).

Figure 14:
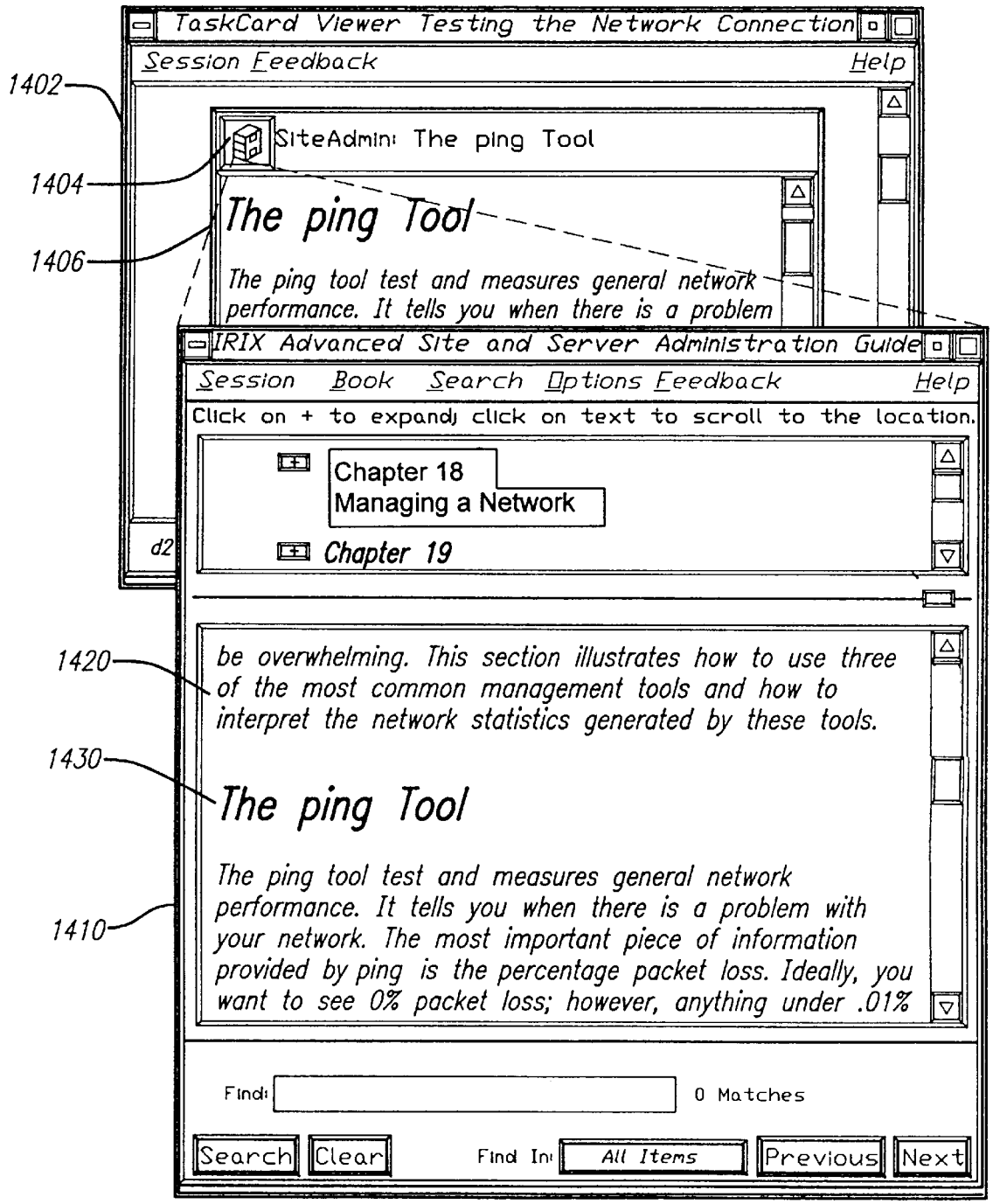
FIG. 14 is an example of a native browser window that is opened when the user presses the "jump" button.

As shown in FIG. 14, the native browser will generally open a new browser window and allow the user to browse through the original source information for the miniview. While miniviews display only predetermined portions of the source information, a native browser allows the user to browse freely through the source information. Such a feature is useful, for example, if the user wishes to review the sections in an online manual surrounding the section available through a miniview.

FIG. 14 shows an example of a taskcard window 1402 with a miniview 1406 open therein. Miniview 1406 displayed a portion on an IRIS InSight manual relating to the unix "ping tool." When the user clicks on jump button 1404 of the miniview, a native IRIS InSight browser opens new window 1410. Window 1410 displays the portion of the IRIS InSight manual displayed in miniview 1406 ("The ping tool tests . . . "), and also displays contextual information 1420 that precedes the miniview information in the original source information. If the user scrolls downward in window 1410, contextual information following the miniview information is also available.

Figure 13A:
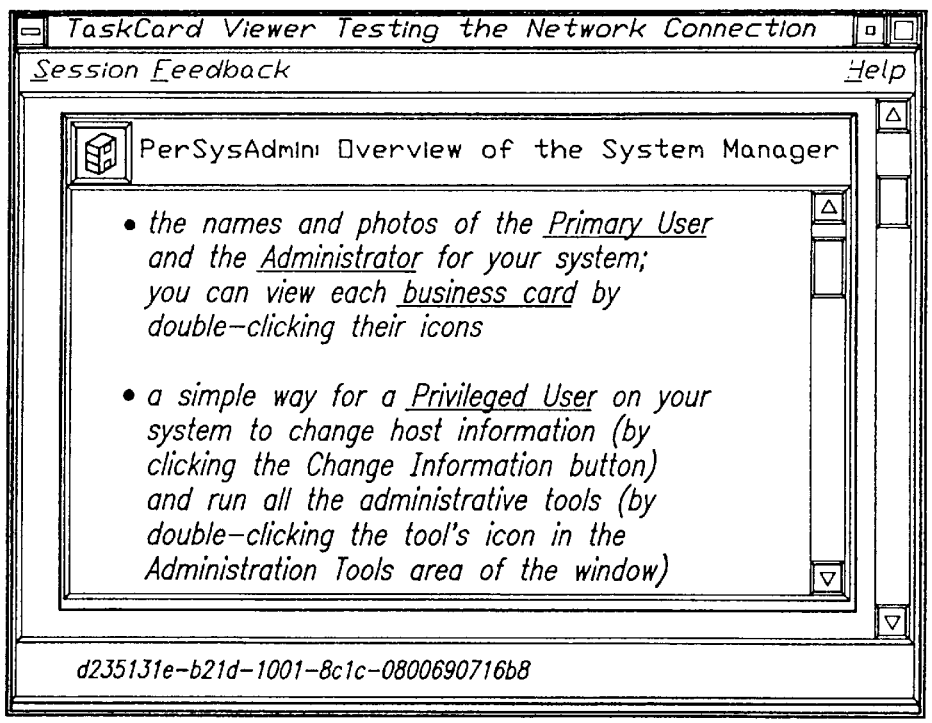
FIGS. 13(a) and 13(b) are examples of miniviews containing embedded information.
Figure 13B:
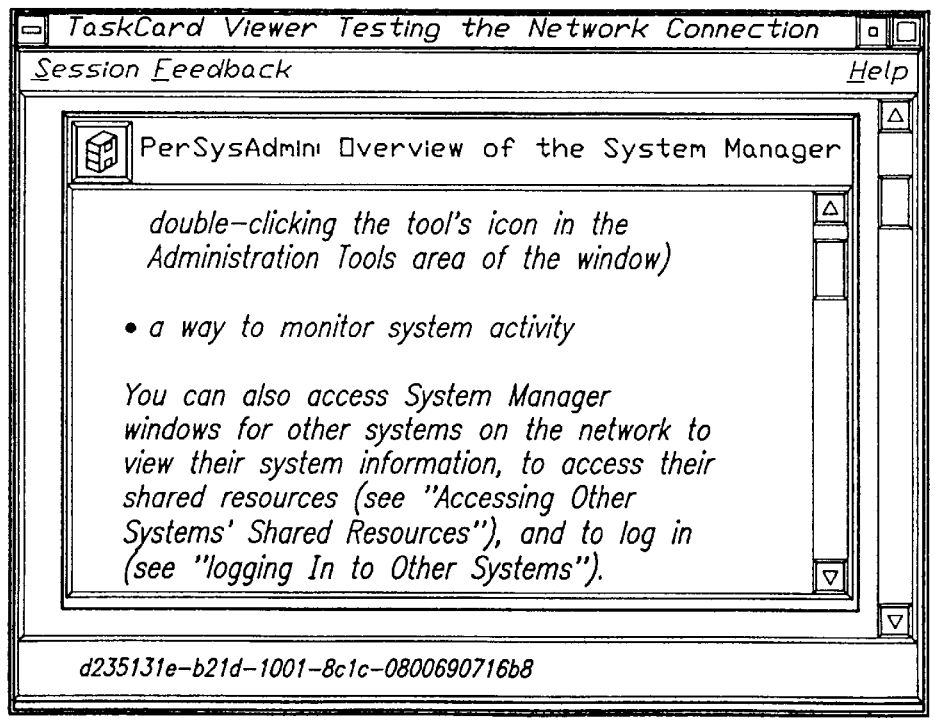

FIG. 7 shows steps performed by a miniview viewer when the native browser allows embedded information. FIGS. 13(*a*) and 13(*b*) are examples of miniviews containing embedded information. In the described embodiment, each miniview viewer incorporates calls to the same routines used by the native browser to implement embedded functions. Glossary terms are described, for example, in "IRIS InSight Professional Publisher Templates" and "IRIS InSight Professional Publisher User's Guide," both of which are herein incorporated by reference.

Figure 12:
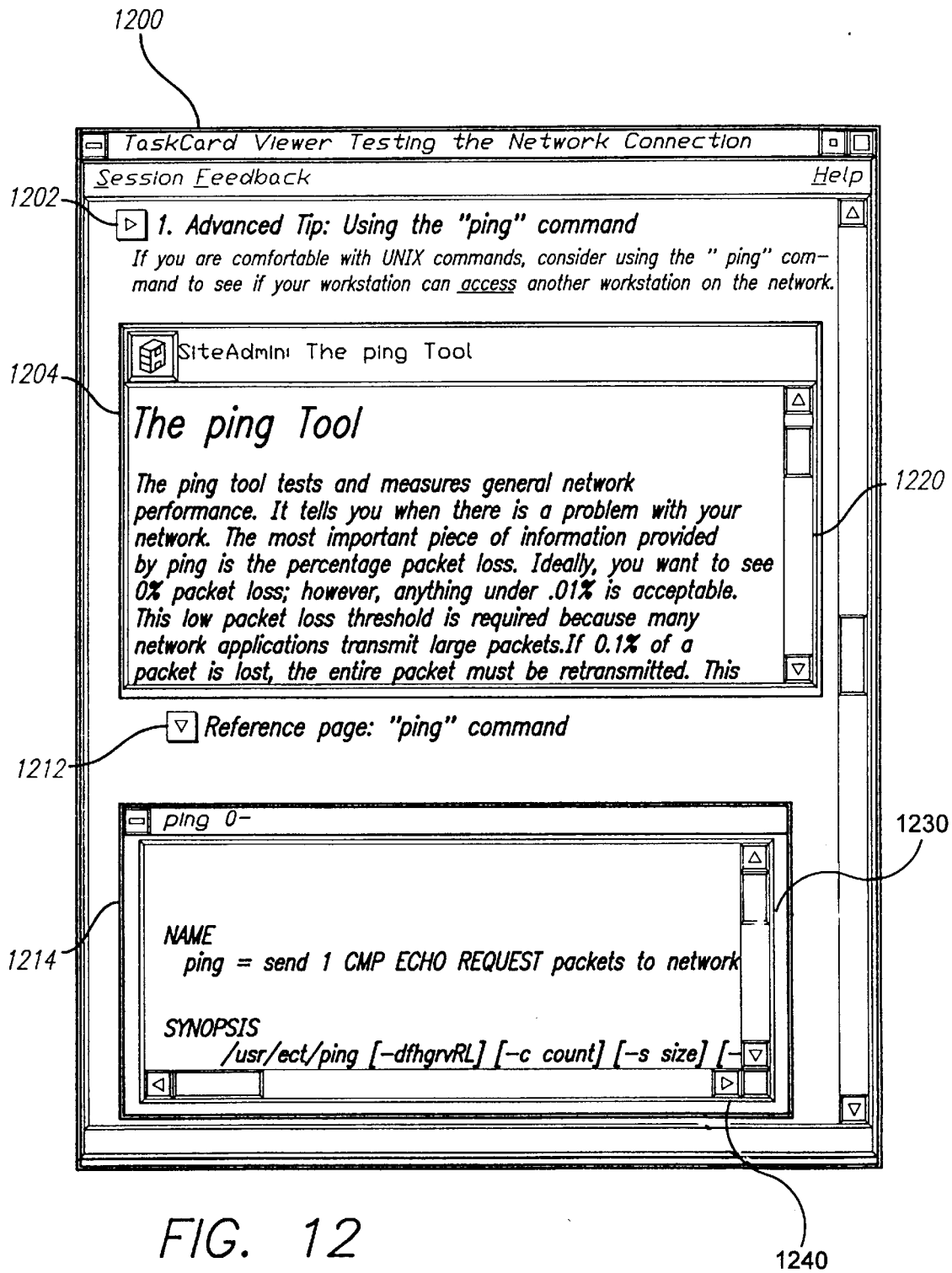
FIG. 12 is an example of a surrounding browser having two miniviews open at once.

FIG. 12 is an example of a surrounding browser 1200 having two miniviews open at once. In the case of FIG. 12, the user has clicked on the Step "Advanced Tip: Using the 'ping' command" 1202, which expands to miniview 1204 (the original source is an IRIS InSight document) and which expands to substep 1212 "Reference page 'ping' command." After the substep 1212 is displayed, the user has also clicked on the substep 1212, which expands to miniview 1214 (the original source is a manpage). Note that miniview 1204 has only a vertical scroll bar 1220, since this particular IRIS InSight document is not wider than the predetermined size of a miniview. In contrast, miniview 1214 has both horizontal and vertical scroll bars 1230 and 1240, since manpages by nature are both longer and wider than the predetermined size of a miniview, and manpages don't support resizing techniques such as word-wrapping. The scroll-bars are dynamic, appearing as needed when content overflows the miniview boundary. This occurs in IRIS InSight books with graphics and tables. As shown in FIG. 12, the predetermined miniview size varies in accordance with whether the miniview was opened by expanding a step (e.g., 1202) or a substep (e.g., 1212). Use of a predetermined miniview size conserves viewing window size, keeps related references near each other, and allows easy comparison of any content within sequential miniviews. Additionally, miniview scroll bar functions respects information types with fixed formats.

In summary, the present invention expands predetermined portions of information displayed by a surrounding browser to display miniviews of the original information. A miniview displays a predetermined portion of the original information in an area of predetermined size. When information of the task browser is expanded, the currently displayed portion of the task browser that is below the expanded portion is moved downwards to make room for the miniview. Miniviews may be displayed for a plurality of different types of information. Each miniview attempts to present its information in a manner similar to that of a native browser for the information type. Thus, the user will see information in the miniview in a format with which he is familiar.

By pressing a "jump" button within the miniview, the user can transfer to a native browser for the information. The native browser displays any portion of the original information desired by the user (including the portion displayed by the miniview) but is not limited to the portion displayed by the miniview. When a miniview is closed (by compressing the step whose expansion caused the miniview to be displayed), the information below the miniview is moved upwards to fill in the space previously occupied by the miniview.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A method for displaying information from an information source to a user, comprising the steps, performed by a data processing system, of:

displaying initial information by way of a surrounding browser;

receiving input indicating that the user has selected a portion of the initial information for expansion; and expanding the indicated information as a miniview of the information source that is inserted vertically within the initial information of the surrounding browser.

2. The method of claim 1, wherein the miniview has a predetermined size.

3. The method of claim 1, wherein the miniview displays a predetermined portion of the original information source.

4. The method of claim 1, wherein the expanding step includes the step of:

moving a portion of the initial information downward to make room for a predetermined size of the miniview.

5. The method of claim 1, wherein the original information to be displayed by the miniview is identified by a "cookie" in TCML code that specifies the appearance of the surrounding browser.

6. The method of claim 5, wherein the expanding step includes the steps of:

retrieving the cookie for the original information associated with the miniview;

retrieving from a database, in accordance with the cookie, a type of the original information; and displaying the miniview in accordance with the retrieved type.

7. The method of claim 5, wherein the expanding step includes the steps of:

retrieving the cookie for the original information associated with the miniview;

retrieving from a database, in accordance with the cookie, a size of the original information that can be displayed within the miniview; and displaying the miniview in accordance with the retrieved size.

8. The method of claim 5, wherein the expanding step includes the steps of:

retrieving the cookie for the original information associated with the miniview;

retrieving from a database, in accordance with the cookie, a location of the original information, where the format of the location varies in accordance with a type of the original information; and displaying in the miniview a portion of the original information stored at the retrieved location.

9. The method of claim 1, wherein the expanding step includes the step of:

displaying embedded information within the miniview, when the original information is of a type having embedded information.

10. The method of claim 1, further including the steps of:

receiving input indicating that a user has selected a second portion of the initial information for expansion; and expanding the indicated information as a second miniview while the first miniview is still expanded, where the second miniview is inserted vertically within the initial information.

11. The method of claim 1, wherein the expanding step includes the step of expanding the indicated portion to display a substep, and further including the steps of:

receiving input indicating that a user has selected the displayed substep for expansion, and expanding the indicated substep as a second miniview while the first miniview is still expanded, where the second miniview is inserted vertically within the initial information.

12. The method of claim 1, further including the steps of:

receiving an indication that the user has compressed the selected portion of the initial information;

removing the miniview from the display; and moving the initial information up on the display to fill the location previously occupied by the miniview.

13. A method for displaying a plurality of types of information to a user, comprising the steps, performed by a data processing system, of:

displaying initial information by way of a surrounding browser;

receiving input indicating that the user has selected a portion of the initial information for expansion;

determining a predetermined type of information required to expand the indicated information; and expanding the indicated information as a miniview that displays the determined type of information that is inserted vertically within the initial information.

14. The method of claim 13, wherein the information displayed in the miniview is predetermined information selected for display in accordance with the information expanded.

15. The method of claim 13, wherein only a predetermined portion of the original information can be displayed in the miniview.

16. The method of claim 13, further including the steps of:

receiving an indication that the user has pressed a "jump" button displayed as a part of the miniview; and transferring control to a native browser designed to work with information having the type displayed by the miniview.

17. The method of claim 13, further including the steps of:

receiving an indication that the user has indicated embedded information displayed in the miniview;

displaying additional information in the miniview that would be displayed by a native browser designed to work with information having the type displayed by the miniview.

18. The method of claim 13, wherein the miniview has a predetermined size.

19. The method of claim 13, further including the steps of:

receiving input indicating that a user has selected a second portion of the initial information for expansion; and expanding the indicated information as a second miniview displaying a second type of the plurality of types of information, while the first miniview is still expanded, where the second miniview is inserted vertically within the initial information.

20. An apparatus for displaying information to a user on a display screen, comprising:

a portion adapted to display initial information on the display screen by way of a surrounding browser;

a portion adapted to receive input from the user indicating that the user has selected a portion of the initial information for expansion; and a portion adapted to expand the indicated information as a miniview that is inserted vertically within the initial information on the display screen.

21. The apparatus of claim 20, wherein the expanding portion includes a portion adapted to expand the indicated information as a miniview of the information source having a predetermined size.

22. The apparatus of claim 20, wherein the expanding portion includes a portion adapted to expand a predetermined portion of the original information source as the miniview.

23. The apparatus of claim 20, wherein expanding portion includes:

a portion adapted to move a portion of the initial information downward to make room for a predetermined size of the miniview.

24. The apparatus of claim 20, wherein the expanding portion includes:

a portion adapted to display embedded information within the miniview, when the original information is of a type having embedded information.

25. The apparatus of claim 20, further including:

a portion adapted to receive an indication that the user has compressed the selected portion of the initial information;

a portion adapted to remove the miniview from the display; and a portion adapted to move the initial information up on the display to fill the location previously occupied by the miniview.

26. A computer program product including:

a computer usable medium having computer readable code embodied therein for causing the computer to display information from an information source to a user, comprising:

computer readable program code devices configured to cause a computer to effect displaying initial information by way of a surrounding browser;

computer readable program code devices configured to cause a computer to effect receiving input indicating that the user has selected a portion of the initial information for expansion; and computer readable program code devices configured to cause a computer to effect expanding the indicated information as a miniview of the information source, where the miniview is inserted vertically within the initial information of the surrounding browser.

27. The computer program product of claim 26, wherein the computer readable program code devices configured to cause a computer to effect expanding includes computer readable program code devices configured to cause a computer to effect expanding the indicated information as a miniview of the information source having a predetermined size.

28. The computer program product of claim 26, wherein the computer readable program code devices configured to cause a computer to effect expanding includes computer readable program code devices configured to cause a computer to effect expanding a predetermined portion of the original information source as the miniview.

29. The computer program product of claim 26, wherein the program code devices configured to cause a computer to effect expanding include:

program code devices configured to cause a computer to effect moving a portion of the initial information downward to make room for a predetermined size of the miniview.

30. The computer program product of claim 26, wherein the program code devices configured to cause a computer to effect expanding include:

program code devices configured to cause a computer to effect displaying embedded information within the miniview, when the original information is of a type having embedded information.

31. The computer program product of claim 26, further including:

program code devices configured to cause a computer to effect receiving an indication that the user has compressed the selected portion of the initial information;

program code devices configured to cause a computer to effect removing the miniview from the display; and program code devices configured to cause a computer to effect moving the initial information up on the display to fill the location previously occupied by the miniview.

* * * * *